G. J. CAVE & G. E. NICHOLSON.
Gage Attachment for Beer-Measures.
No. 195,980. Patented Oct. 9, 1877.
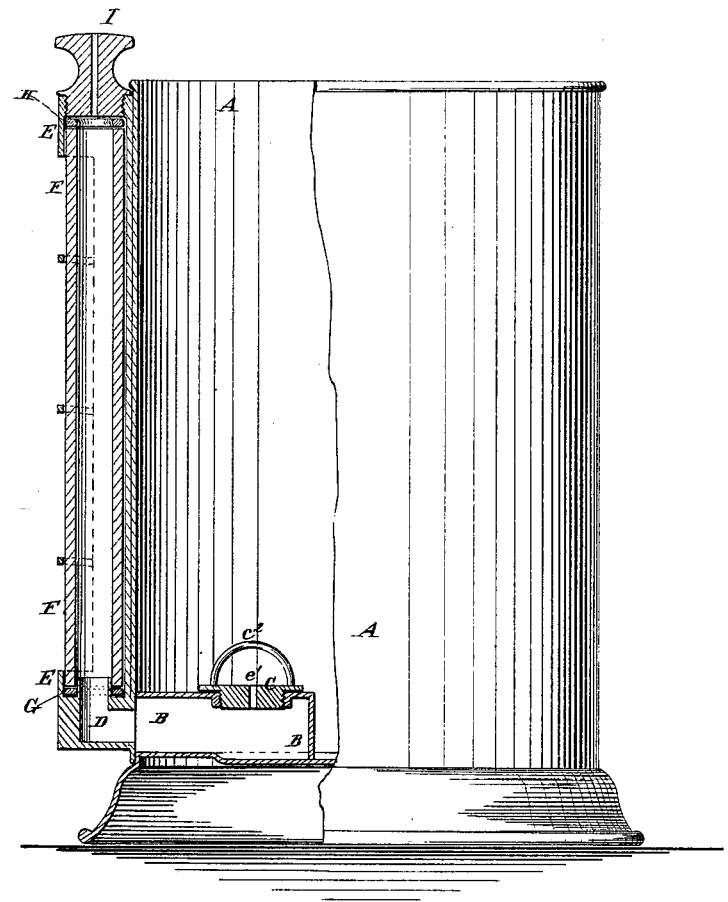

UNITED STATES PATENT OFFICE.

GEORGE J. CAVE AND GEORGE E. NICHOLSON, OF ELIZABETH, NEW JERSEY; SAID NICHOLSON ASSIGNOR TO SAID CAVE.

IMPROVEMENT IN GAGE ATTACHMENTS FOR BEER-MEASURES.

Specification forming part of Letters Patent No. 195,980, dated October 9, 1877; application filed August 18, 1877.

*To all whom it may concern:*

Be it known that we, GEORGE J. CAVE and GEORGE E. NICHOLSON, of Elizabeth, in the county of Union and State of New Jersey, have invented a new and useful Improvement in Beer-Measure, of which the following is a specification:

The figure is a side view, partly in section, of a measure to which our improvement has been applied.

The object of this invention is to furnish an improved measure for measuring beer and other liquids that foam when drawn, which shall be so constructed as to show at once how much of the liquid there may be in the measure, however foamy it may be, so that there need be no waiting for the foam to subside, and no refilling.

The invention consists in the combination of the detachable glass tube, the rubber rings, and the screw-plug with the case, the measure, and the elbow-pipe connected with the interior of the measure, or with a box or trap secured within said measure; and in the combination of the screw-cap, provided with the hole and the handle, with the box or trap secured in the interior of the measure, and connected with a glass tube by an elbow-pipe, as hereinafter fully described.

A represents an ordinary measure, which may hold a quart or any other desired quantity. B is a small box, of any desired shape and size, and which is secured to the bottom and side of the measure A. In the top of the box or trap B is formed a hole of sufficient size to allow the trap to be conveniently cleaned out through it, and which is closed with a cap, C, screwed into it. Through the cap C is formed a small hole, $c^1$, to allow the liquid to readily flow into the trap B.

To the cap C is attached a loop or other handle, $c^2$, for convenience in attaching and detaching the said cap.

D is a short elbow or right-angled pipe, the lower arm of which is secured in a hole in the lower part of the side of the measure A, so as to open into the trap B. The outer arm of the elbow D is surrounded by the lower end of the skeleton case E, which is secured to the outside of the measure A, and within which is placed a glass tube, F, open at both ends. The lower end of the glass tube F rests upon a ring of rubber or other suitable substance, G, placed in the lower end of the case E around the upper end of the elbow-pipe D.

Upon the upper end of the glass tube F, within the upper end of the case E, is placed a ring of rubber or other suitable substance, H, which is pressed down upon the end of the glass tube F by a plug, I, screwed into the upper end of the case E. The screw-plug I has a small hole formed through it, to allow the air contained in the glass tube F to escape as the liquid rises within it, and to allow the air to enter as the liquid flows out. The cross-bars of the case E are so arranged as to serve as indices to show how much liquid there may in the measure.

We are aware that glass tubes have been connected with measures to indicate how much liquid there was in the said measure; but these tubes have been permanently connected with the measure, and could not be detached, so that if they were broken the measure was useless and had to be thrown away. This we do not claim, broadly; but,

Having thus described our invention, what we claim as new, and desire to secure by Letters Patent, is—

1. The combination of the detachable glass tube F, the rubber rings G H, and the screw-plug I with the case E, the measure A, and the elbow-pipe D, connected with the interior of the measure A, or with a box or trap, B, secured within said measure, substantially as herein shown and described.

2. The combination of the screw-cap C, provided with the hole $c^1$ and the handle $c^2$, with the box or trap B, secured in the interior of a measure, A, and connected with a glass tube, F, by an elbow-pipe, D, substantially as herein shown and described.

GEORGE J. CAVE.
GEORGE E. NICHOLSON.

Witnesses:
JAMES T. GRAHAM,
ALEX. F. ROBERTS.